United States Patent [19]

Hayes

[11] 4,390,969
[45] Jun. 28, 1983

[54] ASYNCHRONOUS DATA TRANSMISSION SYSTEM WITH STATE VARIABLE MEMORY AND HANDSHAKING PROTOCOL CIRCUITS

[75] Inventor: Alan B. Hayes, Salt Lake City, Utah

[73] Assignee: Burroughs Corporation, Detroit, Mich.

[21] Appl. No.: 142,608

[22] Filed: Apr. 21, 1980

[51] Int. Cl.³ .................. G06F 3/00; G06F 13/00
[52] U.S. Cl. ........................ 364/900; 370/60;
370/91; 375/11 D; 179/18 FG; 340/825.01;
340/825.52; 307/238.3
[58] Field of Search ... 364/200 MS File, 900 MS File;
307/41, 244, 238.3; 328/55, 56, 66, 67, 75;
340/825.01, 825.02, 825.52, 825.54; 370/60, 94,
91; 375/110; 179/18 FG, 18 AF

[56] References Cited

U.S. PATENT DOCUMENTS

| | | | |
|---|---|---|---|
| 3,676,858 | 7/1972 | Finch et al. | 364/200 |
| 3,753,232 | 8/1973 | Sporer | 364/200 |
| 3,889,237 | 6/1975 | Alferness et al. | 364/200 |
| 3,978,452 | 8/1976 | Barton et al. | 364/200 |
| 4,017,840 | 4/1977 | Schild | 364/200 |
| 4,030,075 | 6/1977 | Barlow | 364/200 |
| 4,085,448 | 4/1978 | Kogge | 364/900 |
| 4,092,492 | 5/1978 | Eachus | 375/37 |
| 4,149,239 | 4/1979 | Jenkins et al. | 364/200 |
| 4,237,447 | 12/1980 | Clark | 340/147.3 |
| 4,246,637 | 1/1981 | Brown et al. | 364/200 |
| 4,251,879 | 2/1981 | Clark | 370/60 |
| 4,267,595 | 5/1981 | Hernandez | 375/95 |
| 4,281,380 | 7/1981 | DeMesa et al. | 364/200 |
| 4,307,378 | 12/1981 | Clark | 340/825.01 |
| 4,314,233 | 2/1982 | Clark | 340/825.02 |
| 4,339,808 | 7/1982 | North | 364/900 |
| 4,346,452 | 8/1982 | Groves | 364/900 |

Primary Examiner—James D. Thomas
Assistant Examiner—Archie E. Williams, Jr.
Attorney, Agent, or Firm—M. L. Young; K. R. Peterson

[57] ABSTRACT

This disclosure relates to a system and method for realizing asynchronous sequential circuits in a manner analagous to the stored state method for synchronous sequential circuits. The circuit is a stored state circuit including a memory and an output register with an input line and an input request line coupled to the memory and the output register having an output data line and an output acknowledge line. A pulse generator is coupled to the input request line so as to generate a timing signal, for transmission to the output register, a fixed period of time after receipt of a request signal on the input request line. A request signal will not appear on the input request line until a data signal on the input data line has stabilized. Furthermore, an acknowledge signal will not be generated until a signal on the output data line has stabilized. In this manner, an asynchronous sequential circuit is constructed which allows for utilization of existing component parts and provides for hazard-free and race-free implementations.

4 Claims, 6 Drawing Figures

ASYNCHRONOUS DATA TRANSMISSION SYSTEM WITH STATE VARIABLE MEMORY AND HANDSHAKING PROTOCOL CIRCUITS

BACKGROUND OF THE INVENTION

1. Field of the Invention

This invention relates to a family of asynchronous stored state sequential circuits and more particularly to such circuits that provide for hazard-free and race-free implementations.

2. Description of the Prior Art

Asynchronous binary circuits are circuits that are activated on receipts of input signals without the requirement of a clock to provide timing signals for synchronization of that operation. Such asynchronous circuits can be employed to create larger asynchronous systems and networks which again operate without being driven by a clock or timing signals. Examples of such prior art synchronous circuits are given in the Clark U.S. Pat. Nos. 4,237,447 and 4,251,879, both of which were issued on applications filed on May 2, 1979. Synchronous state machines are employed in a number of different types of digital systems and particularly in digital data processors. Examples of such synchronous state machines are given in the Ferguson et al. U.S. Pat. No. 3,886,523 and also in the Barton et al. U.S. Pat. No. 3,978,452. The Barton et al. patent discloses a network of data processors which accommodate asynchronous data transfer therebetween by way of data buffers in each processor, each processor being synchronous or clock driven. Such machine state control systems or state machines control the phasing of the operational states of the processor or other digital device. As distinct from such prior art state machines, the present invention is directed toward an asynchronous stored state machine as is further described below.

Prior art asynchronous sequential circuits required large quantities of random logic and a resultant high component count. Furthermore, the circuit complexity of conventional asynchronous state machines increases rapidly as the number of states and the inputs to the state machine increases. As a result, the implementation of reliable machines with more than a relatively small number of states and inputs thereto becomes extremely difficult.

The employment of field programmable read only memories (ROM's) simplifies the process of realizing asynchronous sequential circuits by allowing the development of stored state techniques. Such a technique has been applied to asynchronous sequential circuits such as described by J. L. Huertas and J. I. Acha, "Self-synchronization of Asynchronous Sequential Circuits Employing a General Clock Function", *IEEE Transactions on Computers*, March, 1976, pp. 297-300. In the machines disclosed therein, an internal clock pulse is generated which is required only when the next-state variables and the present-state variables are different. However, such machines do not provide a signalling protocol between like elements of a system which must be provided to delimit data transmissions due to the lack of a system clock.

It is then an object of the present invention to provide an improved asynchronous sequential circuit.

It is another object of the present invention to provide an improved asynchronous circuit which can communicate with similar circuits by delimiting data transmissions without requiring a systems clock.

It is still another object of the present invention to provide an improved asynchronous sequential circuit that is nevertheless hazard-free and race-free.

SUMMARY OF THE INVENTION

In order to achieve the above-identified objects, a feature of the present invention is the provision of an asynchronous sequential circuit in which a circuit cell is provided with an input request line and a pulse generator coupled to the input request line and the cell to transmit a timing signal to the cell a fixed period of time after receipt of the request signal. The asynchronous sequential circuit may be a stored state circuit including a memory and an output register where the timing signal from the pulse generator is transmitted to the output register.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
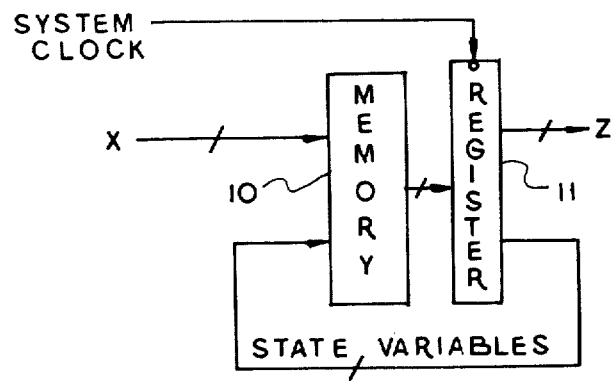
FIG. 1 is a schematic diagram representing prior art stored state synchronous circuits.

A typical stored state implementation of a synchronous sequential circuit of the prior art is illustrated in FIG. 1. As shown therein, memory 10 contains the state table and generates from the current state and inputs, a next state and outputs which are in turn the inputs to register 11. State changes occur periodically and are synchronized with the system clock. However, in an asynchronous system, there is no system clock that can be used to delimit data transmissions and a signalling protocol must be used which somehow incorporates a means to indicate the limits of a transmission. To assure that the data transmitted from one element of the system to another is actually received, some form of closed loop or "handshaking" protocol is required.

A pulse, regardless of its duration, can be too fast for some element in a system. Therefore, signal transitions must be used in asynchronous signalling conventions as the data delimiters. The minimum number of transitions required is two: one to mark the initiation of the operation (generally called REQUEST), and another to mark the termination of the operation (generally called ACKNOWLEDGE). Protocols that use this minimum number of transitions per operation are called two-cycle or non-return-to-zero (NRZ) signalling schemes.

Two-cycle communication with a system or an element of a system can be accomplished by applying data to an input bus and, when the data has become stable, causing a transition on the REQUEST line. When the system or element has completed the operation, it will place data on the output bus, wait for it to stabilize and cause a transition on the ACKNOWLEDGE line. Input data must be stable from before the initiating REQUEST transition until after the terminating ACKNOWLEDGE transition and output data must be stable from before the terminating ACKNOWLEDGE transition until after the next REQUEST transition. An alternative to two-cycle signalling is four-cycle signalling or return-to-zero (RZ) signalling, which uses two transitions each on the REQUEST and ACKNOWLEDGE lines per operation.

Figure 2:
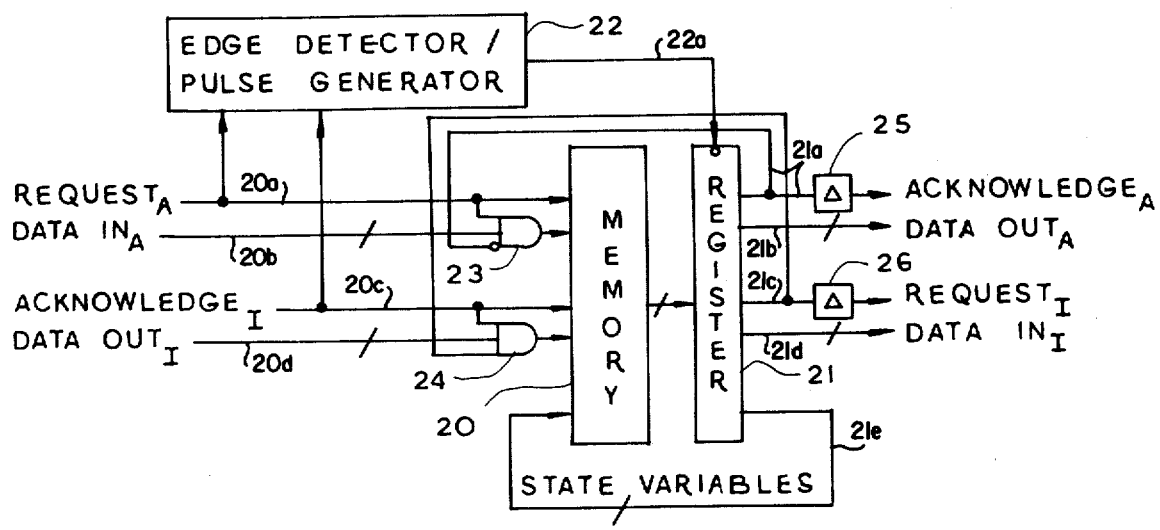
FIG. 2 is a schematic diagram representing an asynchronous sequential circuit of the present invention.

An embodiment of the present invention which employs a four-cycle signalling protocol is shown in FIG. 2 and results in a race and hazard-free asynchronous sequential circuit. As in the prior art synchronous example, memory 20 holds the state table of the machine and generates a next state and outputs which are the input to register 21. State changes occur when edge detector generator 22 produces a pulse, which it does in response to each signal transition on one of the binary input REQUEST or ACKNOWLEDGE lines 20a and 20c, respectively. This pulse must be of sufficient width to satisfy the requirements of register 21 and the trailing edge of this pulse must be delayed from the time of the triggering transition by a sufficient time period so as to allow for propagation delay through data bus gates 23 and 24, memory 20 as well as the minimum setup time of register 21. Gates 23 and 24 on the data buses 20b and 20d are required to assure that transitions, on these lines outside of the periods for which their stability is guaranteed, cannot affect state transmissions which may be occurring concurrently. That is to say, gate 23 insures that no DATA $IN_A$ signal on line 20b is transmitted to memory 20 unless $REQUEST_A$ signal on line 200 is high and there is no $ACKNOWLEDGE_A$ signal out of register 21 on line 20a. Similarly, no DATA $OUT_I$ signal on line 20d is allowed through to memory 20 unless there is also an $ACKNOWLEDGE_I$ signal on line 20c as well as a $REQUEST_I$ signal on line 21c. Delay elements 25 and 26 on the respective $REQUEST_I$ and $ACKNOWLEDGE_A$ lines 21a and 21c of register 21 are employed to assure that the associated data is valid before the corresponding REQUEST or ACKNOWLEDGE signals go high. Such delay elements may be an R-C constant delay circuit, or just a series of gates each of which has a constant propagation delay.

Figure 3:
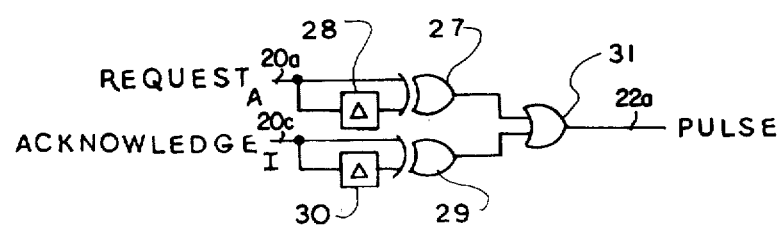
FIG. 3 is a schematic diagram of the edge detector-pulse generator of the circuit of FIG. 2.

A schematic of the edge detector generator 22 of FIG. 2 is illustrated in FIG. 3. As shown therein, each of the REQUEST or ACKNOWLEDGE inputs 20a and 20c respectively are supplied along with a delayed component thereof to respective exclusive OR gates 27 and 29. The outputs of respective gates 27 and 29 are then supplied to OR gate 31 to produce the appropriate output pulse on line 22a.

Figure 6:
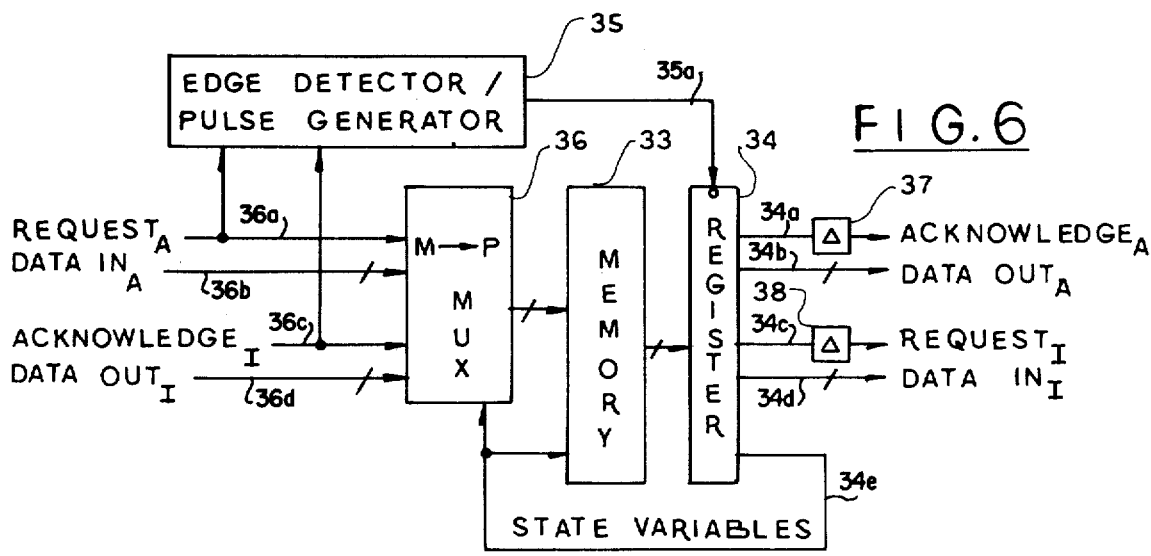
FIG. 6 is a schematic diagram of a second embodiment of the present invention.

A second circuit embodiment of the present invention is illustrated in FIG. 6. This embodiment has the advantage of more efficiently using memory. In most cases, the next state decision depends only on a small subset of the M inputs to the machine. In cases where the maximum size subset of inputs required to determine the next state, P, is significantly less than M, it is possible to substantially reduce the size of memory 33. In FIG. 6, a subset of the input set is selected by multiplexor 36 as a function of the current state of the machine. This realization has the additional advantage that, in most cases, the gates on the data buses 36b and 36c are no longer necessary as these lines will generally only be selected as memory inputs during the period for which their stability is guaranteed.

SIGNALLING PROTOCOL

Figure 4:
FIG. 4 is a set of waveforms illustrating two-cycle signalling as could be employed in the present invention.
Figure 4:
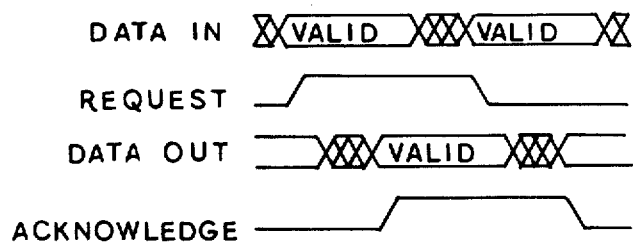

As was indicated above, the present invention may employ two-cycle communication wherein data is applied to an input bus and, when the data has become stable, a transition is caused on the REQUEST line and activating the transmission. When the system or element has completed the operation, it will place data on the output bus, wait for it to stabilize and cause a transition on the ACKNOWLEDGE line. Input data must be stable from before the initiating REQUEST transition until after the terminating ACKNOWLEDGE transition and output data will be stable from before the terminating ACKNOWLEDGE transition until after the next REQUEST transition. Waveforms for such a two-cycle signalling scheme are illustrated in FIG. 4.

This scheme has the advantage of requiring only two wires for overhead, one each for REQUEST and ACKNOWLEDGE. Correct behavior of such a scheme depends upon the relative delays of the data paths and the REQUEST and ACKNOWLEDGE paths. These delays must be such that the sequencing of the data stability with respect to the REQUEST and ACKNOWLEDGE transitions is preserved from one end of the signal path to the other. An alternative (delay insensitive) form of two-cycle signalling uses two wires per data bit and incorporates the REQUEST and ACKNOWLEDGE signals directly in the data. One of the two wires is used to transmit a one (1) and the other a zero (0). An operation is initiated by causing a transition on exactly one of the wires in each pair of the input bus. Regardless of the relative delays of the paths, receipt of the complete input word can be recognized as parity reversal on each input pair at the receiving element. Completion of the operation is indicated by placing data on the output bus in the same manner.

The obvious advantage of two-cycle signalling is that it requires the minimum number of transitions to complete an operation. It has the disadvantage, however, of requiring response to transitions in both directions. As most logic devices tend to be sensitive to levels or to transitions in one direction, this requires extra logic and state information in each element.

Four-cycle signalling as employed in the present invention requires twice the transitions per operation, but results in simpler and more natural circuit implementations. In addition to removing the necessity to respond to transitions in both directions, four-cycle signalling also provides specific intervals for the elements to clear after an operation. Waveforms illustrating four-cycle signalling are contained in FIG. 5.

Figure 5:
FIG. 5 is a set of waveforms illustrating four-cycle signalling as employed in the present invention.
Figure 5:
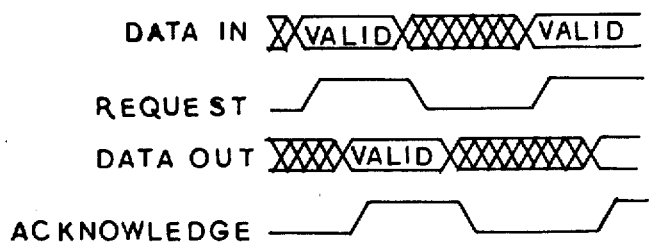

As shown in FIG. 5, in the idle state, both REQUEST and ACKNOWLEDGE signals are low. Input data to the element is required to be valid prior to the REQUEST signal going high and must remain valid until the ACKNOWLEDGE from the element goes high. Once the REQUEST has gone high, it must remain high until the ACKNOWLEDGE goes high. The REQUEST must be high and the output data from the element must be valid prior to the ACKNOWLEDGE signal going high. The ACKNOWLEDGE signal must remain high and the output data must remain valid until the REQUEST goes low. The ACKNOWLEDGE signal must go low before the REQUEST signal may again go high.

An asynchronous sequential circuit is defined here to be an element of a system. The circuit's inputs and outputs consist of data buses and associated REQUEST and ACKNOWLEDGE lines that link it with other elements of the system. The following construction rules are to apply:

1. The input set must contain at least one REQUEST.
2. If the input set contains more than one REQUEST, then external arbitration must be used to preclude concurrent REQUESTS.
3. The input set may contain any number of ACKNOWLEDGE signals.
4. There will be a one-to-one correspondence between transitions on REQUEST and ACKNOWLEDGE lines in the input set and state changes.
5. The output set must contain the associated ACKNOWLEDGE to every REQUEST in the input set.
6. The output set must contain the associated REQUEST to every ACKNOWLEDGE in the input set.
7. In the initial state, all REQUESTS and ACKNOWLEDGES in the input and output sets are low.
8. On each state change, a transition will occur on one and only one of the REQUEST and ACKNOWLEDGE lines in the output set.

The first above rule guarantees that the state machine can start. The external arbitration of the multiple input REQUESTS specified by the second rule assures that the machine will complete handling one REQUEST and will be able to return to the initial state or some other idle state before it is presented with another REQUEST. Rules 5 and 6 and the signalling protocol allow the machine to control the set of possible input transitions. Rules 2, 4, 5, 6, 7 and 8, along with the signalling protocol, guarantee that in every state one and only one of the input set REQUEST and ACKNOWLEDGE lines may change value. Thus, the machine operates in a single-input-change and single-output-change mode.

EPILOGUE

A system and a method have been described above for realizing asynchronous sequential circuits in a manner analagous to the stored state method for synchronous sequential circuits. The method simplifies the process of constructing asynchronous sequential circuits, allows utilization of existing component parts, and avoids the necessity for concern with races or hazards.

While but few embodiments of the present invention have been disclosed, it will be apparent to one skilled in the art that variations and modifications may be made therein without departing from the spirit and the scope of the invention as claimed.

What is claimed is:

1. An asynchronous binary circuit comprising:
    a stored state circuit cell including a memory containing a state table of sets of state variables and an output register coupled to said memory to receive a current set of state variables;
    said cell having a source input data line and a source request line coupled to said memory, said output register having output lines;
    said output register being coupled to the input of said memory to address said memory along with said input data to fetch the next set of state variables; and
    a pulse generator coupled to said source request line and having a timing line coupled to said output register, said pulse generator including delay means to delay the transmission of a timing signal to said output register a fixed period of time after the receipt of a binary signal transition on said source request line.

2. An asynchronous circuit according to claim 1 wherein:
    said output register contains output data; and
    said output lines further include a source output data line and a source acknowledge line, a destination request line and a destination output data line, said destination request line including delay means to delay the transmission of a destination request signal until there is a data signal on said destination output data line.

3. An asynchronous circuit according to claim 2 wherein:
    said source acknowledge line includes delay means to delay the transmission of said source acknowledge signal until there is a data signal on said source output data line.

4. An asynchronous circuit according to claim 3 wherein:
    said source input data line is provided with a transmission gate coupled to said memory cell; said source transmission gate being coupled to said source request line and said source acknowledge line.

* * * * *